United States Patent
Kwan

(10) Patent No.: US 7,424,609 B2
(45) Date of Patent: Sep. 9, 2008

(54) METHOD AND SYSTEM FOR PROTECTING AGAINST COMPUTER VIRUSES

(75) Inventor: Tony Kwan, Kew (AU)

(73) Assignee: Computer Associates Think, Inc., Islandia, NY (US)

( * ) Notice: Subject to any disclaimer, the term of this patent is extended or adjusted under 35 U.S.C. 154(b) by 748 days.

(21) Appl. No.: 10/888,738

(22) Filed: Jul. 9, 2004

(65) Prior Publication Data

US 2005/0177868 A1 Aug. 11, 2005

Related U.S. Application Data

(60) Provisional application No. 60/486,754, filed on Jul. 11, 2003.

(51) Int. Cl.
*G06F 9/00* (2006.01)

(52) U.S. Cl. .............. 713/161; 713/168; 713/188; 713/189; 713/193; 713/194

(58) Field of Classification Search ............ 713/161, 713/188, 189, 193, 194, 168
See application file for complete search history.

(56) References Cited

U.S. PATENT DOCUMENTS

| 5,027,397 A * | 6/1991 | Double et al. ............ 713/194 |
| 5,142,680 A * | 8/1992 | Ottman et al. ............ 717/176 |
| 5,398,285 A * | 3/1995 | Borgelt et al. ............ 380/30 |
| 5,948,104 A | 9/1999 | Gluck et al. |
| 5,956,408 A | 9/1999 | Arnold |
| 6,049,671 A * | 4/2000 | Slivka et al. ............ 717/173 |
| 7,016,968 B2 * | 3/2006 | Willner et al. ............ 709/231 |
| 2003/0065926 A1 | 4/2003 | Schultz et al. |
| 2003/0084322 A1 | 5/2003 | Schertz et al. |

FOREIGN PATENT DOCUMENTS

EP 1280040 1/2003

OTHER PUBLICATIONS

Marmelstein R E et al. "A distributed architecture for an adaptive computer virus immune system" Systems, Man, and Cybernetics, 1998. 1998 IEEE International Conference on San Diego, CA, USA Oct. 11-14, 1998, New York, NY USA, IEEE, US, Oct. 11, 1998, pp. 3838-3843 XP010310923 ISBN: 0-7803-4778-1 the whole document.

Norton Antivirus Corporate Edition 7.6 Implementation Guide, Online, Sep. 12, 2001, pp. 355-367, XP002312339 Cupertino, CA, USA Retrieved from the internet: URL:ftp://ftp.symantec.com/public/english_us_canada/products/norton_antivirus/navcorp/manuals/navce76i.pdf Retrieved on Jan. 4, 2005, the whole document.

* cited by examiner

*Primary Examiner*—Thomas R Peeso
(74) *Attorney, Agent, or Firm*—Baker Botts L.L.P.

(57) ABSTRACT

A method for delivering an update to at least one user, including creating an electronic communication including an update and a unique signature identifying, the electronic communication as including the update and sending the electronic communication to the user.

117 Claims, 3 Drawing Sheets

METHOD AND SYSTEM FOR PROTECTING AGAINST COMPUTER VIRUSES

REFERENCE TO RELATED APPLICATION

The present disclosure is based on and claims the benefit of Provisional Application 60/486,754 filed Jul. 11, 2003, entitled METHOD AND SYSTEM FOR PROTECTING AGAINST COMPUTER VIRUSES the entire contents of which are herein incorporated by reference.

TECHNICAL FIELD

The present disclosure relates to computer systems. More specifically, the present disclosure relates to a method and system for protecting against computer viruses.

DESCRIPTION OF THE RELATED ART

In today's highly computer dependant environment, computer security is a major concern. The security of computers is routinely threatened by malicious programs such as computer viruses. Trojan horses, worms and the like. Once computers are infected with these malicious programs, the malicious programs may have the ability to damage expensive computer hardware, destroy valuable data, tie up limited computing resources or compromise the security of sensitive information.

To guard against the risk of malicious programs, antivirus programs are often employed. Antivirus programs are computer programs that can scan computer systems to detect malicious programs embedded within computer memory and infected computer files. Malicious programs can then be removed from memory or infected files, infected files may be quarantined or the infected file may be deleted from the computer system.

Antivirus programs currently use a wide range of techniques to detect and remove malicious programs from infected computer systems. One technique for detecting malicious programs is to perform a virus signature scan. According to this technique, computer files, key hard disk sectors such as the boot sector and master boot record (MBR) and computer system memory are searched for the presence of virus signatures. Virus signatures are key patterns of computer code that are known to be associated with malicious programs. Virus signature scans are highly effective tools for maintaining computer system security provided that the virus signature scanner has access to a database of known virus signatures that is kept up to date. This is because the virus signature scanner cannot identify a malicious program unless a virus signature for that malicious program has been incorporated into the virus signature scanner's database of known virus signatures.

Another technique for detecting and removing malicious programs is to perform a heuristic virus scan. Heuristic virus scans are able to intelligently estimate whether computer code is a malicious program. This technique relies on programmed logic, called heuristics, to make its determinations. While a heuristic virus scan has the potential to protect against viruses that are new and unknown, the efficacy of these scanners are constantly improved by updated heuristics that are obtained and incorporated into the heuristic virus scanners in much the same way that new virus signatures should be obtained when using the virus signature scan technique.

New viruses are introduced to computers with increasing frequency. Previously, computers tended to exchange information primarily through floppy disks. Because of the limitations of this format, exchange of information between computers was slow and infrequent. Because malicious programs propagate from one computer to another through the exchange of information, this slow exchange of information limited the propagation of malicious programs.

Today computers are more interconnected than ever. The frequent use of email and the popularity of always-on high-speed internet connections provide fertile ground for the propagation of malicious programs.

The use of email is particularly suited for the propagation of malicious programs. Increasingly sophisticated malicious programs such as worms are able to commandeer the email client program on an infected computer and use it to send an email carrying the malicious program to every email address known to the email client program. For example a list of contacts or address book incorporated into the email client. The result is that the computer resources of a computer user are exploited to propagate the malicious program, often before the user even realizes that his or her computer has been infected. Because of the speed at which these malicious programs can propagate, a well-adapted malicious program can quickly turn into a global outbreak.

During such an outbreak, providers of antivirus programs move quickly to examine samples of the malicious program to ascertain its virus signature or new heuristics that can be used to detect it. The providers then distribute the virus signatures or heuristics to their customers. Once the customers receive the virus signatures or heuristics, they can incorporate it into their virus signature scanner's database of known virus signatures or heuristic virus scanner thereby protecting them from that particular outbreak threat.

However, because computer users are required to affirmatively download these virus signatures or heuristics and incorporate them into their database of known virus signatures or heuristic virus scanner, a user might not find out about the outbreak and download the required updates before the malicious program has already struck the user's computer and potentially used it to propagate further. The delay caused by users not downloading or delaying in downloading an update may result in a malicious program such as a virus or worm spreading across networks with no way to detect and clean the malicious program.

SUMMARY

A method for delivering an update to at least one user, including creating an electronic communication including an update and a unique signature identifying, the electronic communication as including the update and sending the electronic communication to the user.

A method for receiving an update including receiving an electronic communication, identifying whether the electronic communication includes an update and applying the update when the electronic communication has been identified as including an update.

A method for delivering an update to at least one user including creating an electronic communication including an alert message and sending the electronic communication including the alert message to the user.

A method for receiving an update including receiving an electronic communication, identifying whether the electronic communication includes an alert message and displaying the alert message.

A method for delivering a sample including performing a heuristic virus scan on a sample, creating an electronic communication including the sample when the sample is found to have at least a low risk of being infected by a malicious program and sending the electronic communication to a provider.

A system for delivering an update to at least one user including a creating unit for creating an electronic communication including an update and a unique signature identifying the electronic communication as including the update and a sending unit for sending the electronic communication to the user.

A system for receiving an update including a receiving unit for receiving an electronic communication, an identifying unit for identifying whether the electronic communication includes an update and an applying unit for applying the update when the electronic communication has been identified as including an update.

A system for delivering an update to at least one user, including a creating unit for creating an electronic communication including an alert message and a sending unit for sending the electronic communication including the alert message to the user.

A system for receiving an update including a receiving unit for receiving an electronic communication, an identifying unit for identifying whether the electronic communication includes an alert message and a displaying unit for displaying the alert message.

A system for delivering a sample including a performing unit for performing a heuristic virus scan on a sample, a creating unit for creating an electronic communication including the sample when the sample is found to have at least a low risk of being infected by a malicious program and a sending unit for sending the electronic communication to a provider.

A computer system including a processor and a program storage device readable by the computer system, embodying a program of instructions executable by the processor to perform method steps for delivering an update to at least one user, the method including the steps of creating an electronic communication including an update and a unique signature identifying the electronic communication as including the update and sending the electronic communication to the user.

A computer system including a processor and a program storage device readable by the computer system, embodying a program of instructions executable by the processor to perform method steps for receiving an update, the method including the steps of receiving an electronic communication, identifying whether the electronic communication includes an update and applying the update when the electronic communication has been identified as including an update.

A computer system including a processor and program storage device readable by the computer system, embodying a program of instructions executable by the processor to perform method steps for delivering an update to at least one user, the method including the steps of creating an electronic communication including an alert message and sending the electronic communication including the alert message to the user.

A computer system including a processor and a program storage device readable by the computer system, embodying a program of instructions executable by the processor to perform method steps for receiving an update, the method including the steps of receiving an electronic communication, identifying whether the electronic communication includes an alert message and displaying the alert message.

A computer system including a processor and a program storage device readable by the computer system, embodying a program of instructions executable by the processor to perform method steps for delivering a sample, the method including the steps of performing a heuristic virus scan on a sample, creating an electronic communication including the sample when the sample is found to have at least a low risk of being infected by a malicious program and sending the electronic communication to a provider.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
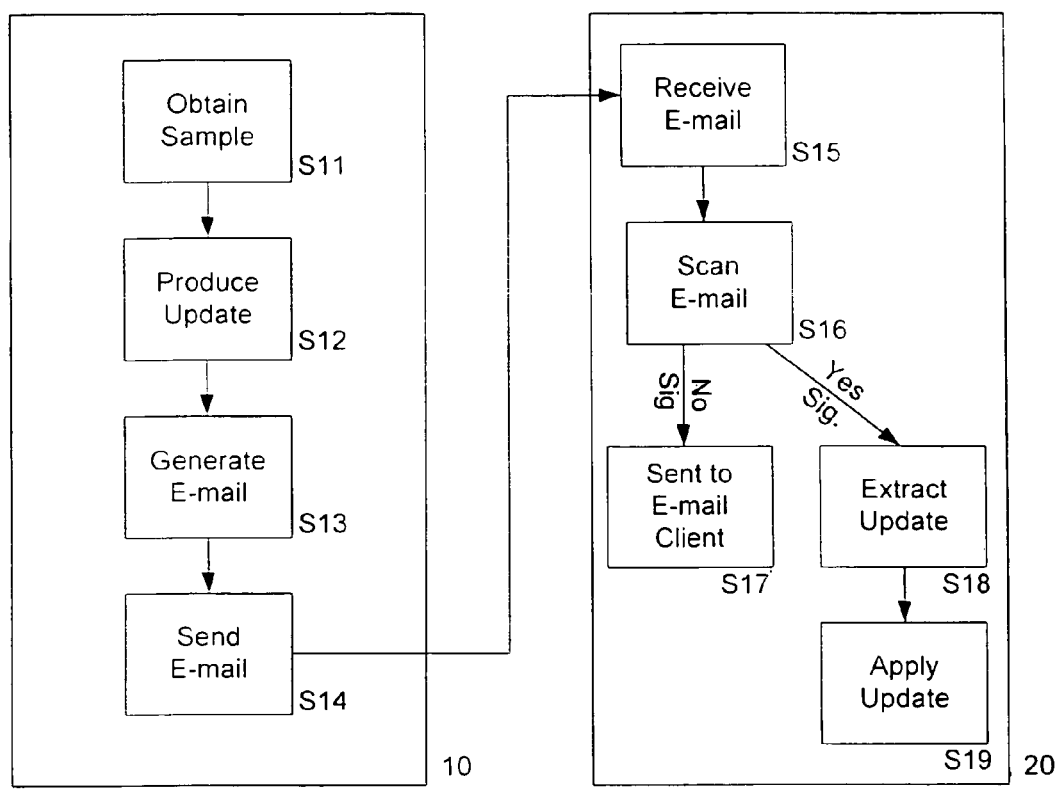
FIG. 1 shows an example of one embodiment of the method and system of the present disclosure.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Providers of antivirus programs are generally able to obtain samples of new and unknown malicious programs and use them to produce antivirus updates such as virus signatures and heuristics. Providers may then be able to quickly distribute these antivirus updates and see that they are appropriately incorporated into the antivirus software installed on their customers' computers before a new or unknown malicious program launches a global outbreak.

Figure 2:
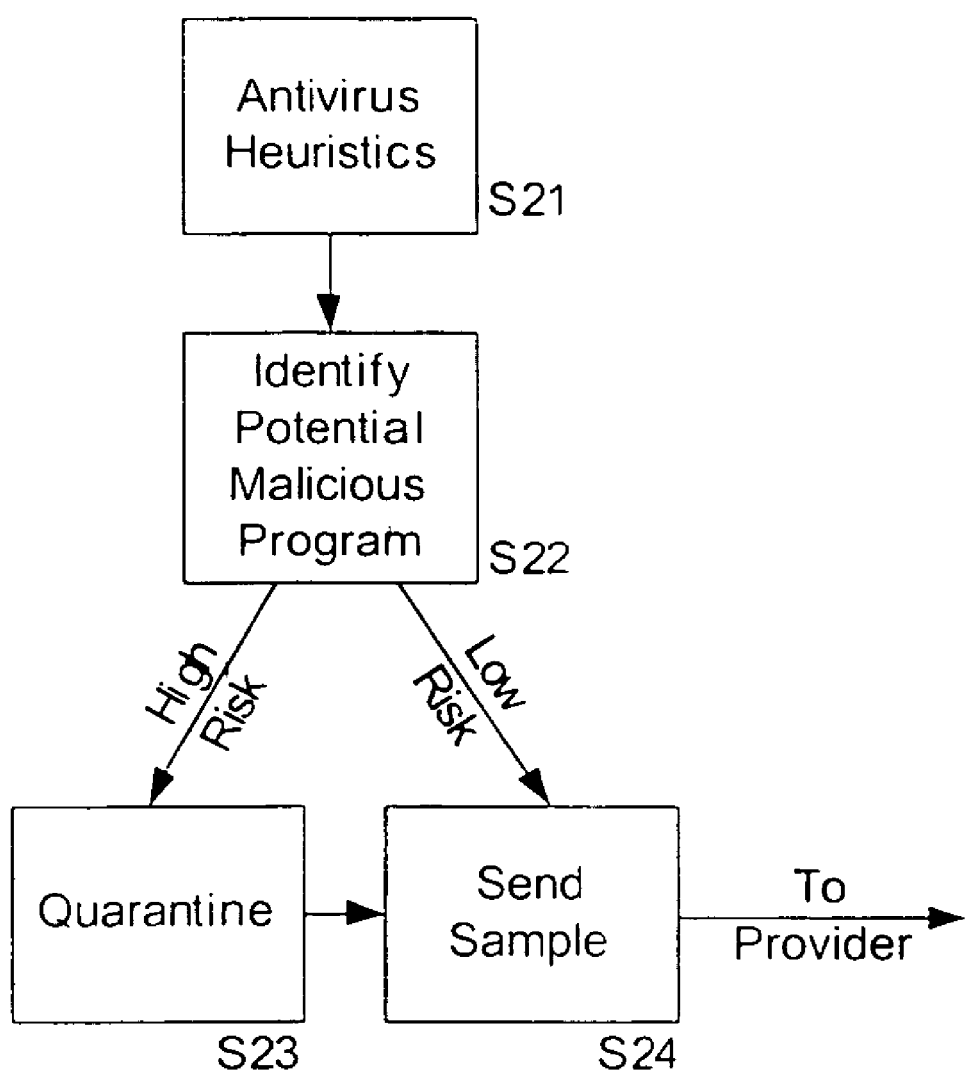
FIG. 2 shows an example of another embodiment of the method and system of the present disclosure.

An embodiment of the present disclosure is illustrated in FIG. 1. According to this embodiment of the present disclosure, a provider of an antivirus program, for example a computer network server maintained by the provider, carries out the method steps within the provider group 10. The provider may first obtain a sample of a new or previously unknown malicious program (Step S11). Generally, samples of new and previously unknown malicious programs are obtained by closely monitoring the internet and communicating with those people who are most likely to encounter new and unknown malicious programs. An alternative method for obtaining new and unknown samples of malicious program is shown in FIG. 2 and will be described in more detail below.

The provider may study obtained samples to produce an update. This update may be a virus signature, a heuristic update, a program update to the antivirus program itself or any other program element that is capable of updating a computer program. The update may be an update to the antivirus program scanner. For example, the update is capable of detecting and eliminating the obtained malicious program from an infected computer system.

The provider may be able to obtain an effective update without the need for obtaining a sample and producing an update. For example, the provider might discover or otherwise acquire an already made update. Therefore, the steps of obtaining a sample S11 and producing an update S12 are more generally referred to as acquiring an update.

The provider then generates an antivirus update electronic communication S13. This electronic communication can be any communication of data such as, for example, binary data across any computer network or direct connection, wired or wireless, some examples include the internet, one or more intranets, a local area network (LAN), a wide area network (WAN) and an ad hoc wireless connection between multiple computers. For example this electronic communication can be an email or instant message sent over the internet. An instant message is a form of instant two-way communication between more than one user. Examples of instant message systems are America Online® Instant Messenger and Yahoo!® Messenger. This electronic communication may include the new update along with a digital signature. A digital signature is a marker that identifies the electronic communication as being an authentic electronic communication sent by the provider and bearing an update. This digital signature may be encrypted or otherwise made secure so that it is more difficult for entities other than the provider to create an accurate digital signature. The update may be compressed or uncompressed and is associated with the electronic communication, for example, as an email attachment.

According to an embodiment of the present disclosure, the electronic communication may also include an alert message. The alert message can, for example, be used to communicate information about a current virus outbreak. The alert message could also include, for example, a link to an update or instructions as to where the user can obtain an update. Where an alert message is used to send a link to an update or instructions as to where the user can obtain an update, the actual update might not be included as part of the electronic communication.

The electronic communication is sent to as many users as is desired (Step S14). For example, the electronic communication may be sent to users who are customers of the provider and have purchased an antivirus program from the provider within a predetermined unit of time such as a year. The electronic communication may be routed to the users by the use of an addressing system, for example, an email address or static internet protocol (IP) addresses. The address may be stored in a database of user addresses maintained by the provider. The provider may build and maintain this database by information provided by the various users, for example, upon product registration or product activation of the antivirus product.

According to an embodiment of the present disclosure, a user of the antivirus program, for example, a computer maintained by the user, carries out the method steps within the user group 20. The user receives the electronic communication (Step S15). Reception of the electronic communication can be achieved automatically through a computer program running on the user's computer. This computer program may be a stand-alone computer program that monitors communication traffic received by the user's computer or it may be a plug-in incorporated into a program that monitors communication traffic received by the user's computer. The computer program may be a plug-in for a firewall, a plug-in for an email client used by the user such as Microsoft® Outlook, an email proxy or any other program that monitors communication traffic received by the user's computer. The communication traffic may be monitored by a feature of a computer security product that contains both an antivirus program as well as a firewall program. For example, the communication traffic may be monitored by a feature of an antivirus program that scans incoming electronic communications for viruses. For example, the electronic communication may be in the form of an instant message and is monitored by the instant message client program running on the user's computer.

The received electronic communication is scanned (Step S16) by the entity that received it or another entity that is in communication with the entity that received it. For example, the email client plug-in might perform the scan, or the instant message client might initiate another program that performs the scan. For example the electronic communication may be scanned by a scanner plugged into the transmission control protocol/internet protocol (TCP/IP) stack. The scanner may scan data coming through all TCP/IP ports before the data is passed to an application. For example, a scanner may be plugged into simple mail transfer protocol (SMTP) and post office protocol (POP), for example POP3.

The communication is scanned for the presence of a digital signature indicating that the electronic communication is an authentic update being sent by the provider. Where the digital signature is encrypted, the same encryption key used by the provider to encrypt the digital signature is used by the electronic communication scanner to decrypt the digital signature.

If the electronic communication scanner detects an authentic digital signature from the provider, the electronic communication is routed to a program or program element that can extract the update (Step S18) provided an update has been incorporated into the electronic communication. If the electronic communication scanner does not detect an authentic digital signature from the provider, the electronic communication is allowed to proceed as it would have if no electronic communication scanner was used. For example, an email containing an authentic digital signature from the provider may be routed to the antivirus program while an email not containing an authentic digital signature from the provider may be allowed to proceed to the email client. An instant message containing an authentic digital signature from the provider may be routed to an update extraction program while an instant message not containing an authentic digital signature from the provider may be allowed to proceed to the instant message client.

Where there is an update extracted from the electronic communication, the extracted update can be applied to the antivirus program (Step S19). If the update includes virus signatures, these virus signatures can be added to the database of known virus signatures. If the update includes heuristics, these heuristics can be incorporated into the heuristic virus scanner. If the update includes a software update to the antivirus software, such as a patch, the software update may be applied to the antivirus software. According to an embodiment of the present disclosure, the user may be offered a choice of allowing the updates to be applied automatically or having the user consent to the application of every update. Where the user's consent is requested, the update will not be applied until the user's consent is given. The user may be prompted for his or her consent by a user interface, for example, a dialog window.

Where the electronic communication contains an alert message, the alert message can be displayed to the user by a user interface, for example, a dialog window. If there is a link to an update or instructions as to where the user can obtain an update included with the alert message, this information will be similarly conveyed.

Obtaining samples of new and unknown malicious programs is a part of keeping antivirus programs effective against the latest malicious virus threats. FIG. 2 shows an alternative method for obtaining new and unknown samples of malicious program. According to an embodiment of the present disclosure, the antivirus program used by the user includes a heuristic virus scanner that is able to intelligently estimate whether computer code is a malicious program. When a heuristic antivirus scanner is initiated on a user's computer (Step S21), a determination is made whether a given file, key hard disk sector or system memory contains a malicious program. In the usual case the heuristic virus scanner determines that there is no risk of a malicious program. However, when suspicious code is found, the heuristic virus scanner determines if there is a high risk or a low risk of infection from a malicious program. When the heuristic virus scanner determines that there is a high risk, the affected file will be quarantined or otherwise neutralized (Step S23). The high risk file is then included in an electronic communication and sent to the provider (Step S24) for further study and potentially to use the sample to produce a virus signature update or heuristic update. When the heuristic virus scanner has determined that there is a low risk, the file will not be quarantined. This prevents the heuristic virus scanner from returning too many false positives and quarantining too many healthy files potentially causing users to stop using the heuristic virus scanner in the future. However, low risk files, may still occasionally be infected with actual malicious programs. Therefore, low risk files may be included in an electronic communication and sent to the provider (Step S24) as well.

Figure 3:
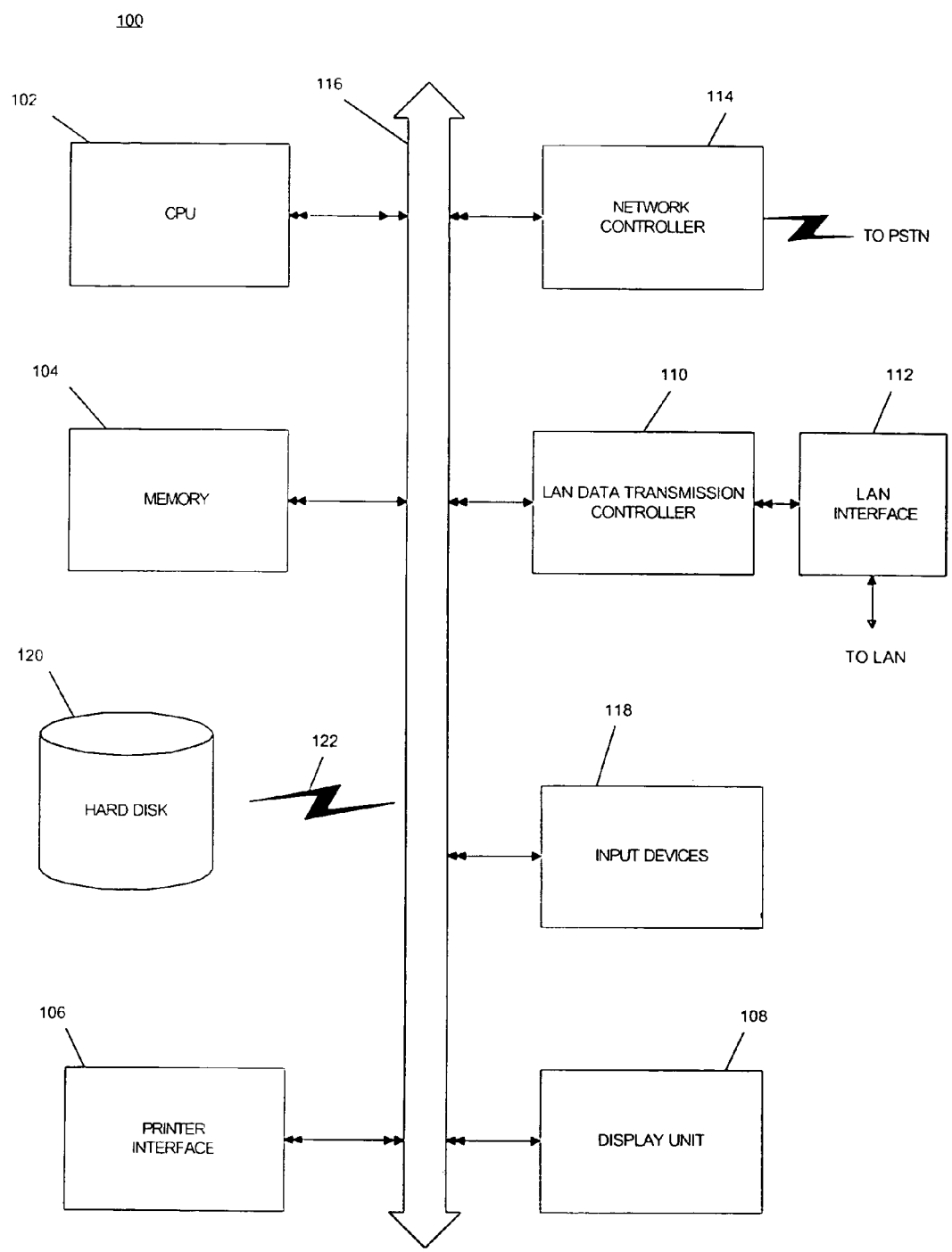
FIG. 3 shows an example of a computer that may be used for implementing various aspects of the present disclosure.

FIG. 3 shows an example of a computer which may implement the methods and systems of the present disclosure. The systems and methods of the present disclosure may be implemented in the form of one or more software applications running on or more computer system, for example, a mainframe, personal computer (PC), handheld computer, server, gateway, etc. The software applications may be stored on recording media locally accessible by the computer systems, for example, floppy disk, compact disk, hard disk, etc., or may be remote from the computer systems and accessible via a hard wired or wireless connection to a network, for example, a local area network, or the Internet.

An example of a computer capable of implementing the present method and system is shown in FIG. 3. The computer referred to generally as system 500 may include a central processing unit (CPU) 502, memory 504, for example, Random Access Memory (RAM), a printer interface 506, a display unit 508, a (LAN) local area network data transmission controller 510, a LAN interface 512, a network controller 514, an internal bus 516 and one or more input devices 518, for example, a keyboard, mouse etc. As shown, the system 500 may be connected to a data storage device, for example, a hard disk, 520, via a link 522.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for delivering an update to at least one user, comprising:
    initiating, by a program provider, delivery of an update to at least one user;
    creating an electronic communication comprising the update and a unique signature identifying said electronic communication as including said update; and
    sending said electronic communication to said at least one user.

2. The method of claim 1, wherein said electronic communication is an email.

3. The method of claim 1, wherein said electronic communication is an instant message.

4. The method of claim 1, wherein said update includes one or more virus signatures.

5. The method of claim 1, wherein said update includes one or more heuristics.

6. The method of claim 1, wherein said update includes a program update.

7. A method for receiving an update, comprising:
    receiving an electronic communication using a receiving unit;
    scanning the electronic communication, using the receiving unit, for a unique signature, wherein the unique signature identifies that the electronic communication contains an update;
    identifying whether said electronic communication includes the update;
    passing the electronic communication to an applying unit capable of applying the update if the electronic communication has been identified as including an update; and
    applying said update.

8. The method of claim 7, wherein said electronic communication is an email.

9. The method of claim 7, wherein said electronic communication is an instant message.

10. The method of claim 7, wherein said update includes one or more virus signatures.

11. The method of claim 7, wherein said update includes one or more heuristics.

12. The method of claim 7, wherein said update includes a program update.

13. A method for delivering an update to at least one user, comprising:
    creating an electronic communication comprising an alert message, wherein the alert message comprises information about a virus outbreak; and
    sending said electronic communication comprising said alert message to said at least one user.

14. The method of claim 13, wherein said alert message includes a link to an update.

15. The method of claim 14, wherein said update includes one or more virus signatures.

16. The method of claim 14, wherein said update includes one or more heuristics.

17. The method of claim 14, wherein said update includes a program update.

18. The method of claim 13, wherein said alert message includes instructions for obtaining an update.

19. The method of claim 18, wherein said update includes one or more virus signatures.

20. The method of claim 18, wherein said update includes one or more heuristics.

21. The method of claim 18, wherein said update includes a program update.

22. The method of claim 13, wherein said electronic communication additionally comprises a unique signature identifying said electronic communication as including said alert message.

23. The method of claim 13, wherein said electronic communication is an email.

24. The method of claim 13, wherein said electronic communication is an instant message.

25. A method for receiving an update, comprising:
    receiving an electronic communication;
    identifying whether said electronic communication includes an alert message, wherein the alert message comprises information about a virus outbreak; and
    displaying said alert message.

26. The method of claim 25, wherein said alert message includes a link to an update.

27. The method of claim 26, wherein said update includes one or more virus signatures.

28. The method of claim 26, wherein said update includes one or more heuristics.

29. The method of claim 26, wherein said update includes a program update.

30. The method of claim 25, wherein said alert message includes instructions for obtaining an update.

31. The method of claim 30, wherein said update includes one or more virus signatures.

32. The method of claim 30, wherein said update includes one or more heuristics.

33. The method of claim 30, wherein said update includes a program update.

34. The method of claim 25, wherein said electronic communication additionally comprises a unique signature identifying said electronic communication as including said alert message.

35. The method of claim 25, wherein said electronic communication is an email.

36. The method of claim 25, wherein said electronic communication is an instant message.

37. A method for delivering a sample, comprising: performing a heuristic virus scan on a sample;
creating an electronic communication comprising said sample when said sample is found to have at least a low risk of being infected by a malicious program; and
sending said electronic communication to a provider.

38. The method of claim 37, wherein said electronic communication is an email.

39. The method of claim 37, wherein said electronic communication is an instant message.

40. A system for delivering an update to at least one user, comprising:
a program provider being operable to initiate delivery of an update to at least one user;
a creating unit for creating an electronic communication comprising the update and a unique signature identifying said electronic communication as including said update; and
a sending unit for sending said electronic communication to said at least one user.

41. The system of claim 40, wherein said electronic communication is an email.

42. The system of claim 40, wherein said electronic communication is an instant message.

43. The system of claim 40, wherein said update includes one or more virus signatures.

44. The system of claim 40, wherein said update includes one or more heuristics.

45. The system of claim 40, wherein said update includes a program update.

46. A system for receiving an update, comprising:
a receiving unit for receiving an electronic communication and scanning the electronic communication for a unique signature, wherein the unique signature identifies that the electronic communication contains an update;
an identifying unit for identifying whether said electronic communication includes an update and passing the electronic communication to an applying unit; and
the applying unit for applying said update when said electronic communication has been identified as including an update.

47. The system of claim 46, wherein said electronic communication is an email.

48. The system of claim 46, wherein said electronic communication is an instant message.

49. The system of claim 46, wherein said update includes one or more virus signatures.

50. The system of claim 46, wherein said update includes one or more heuristics.

51. The system of claim 46, wherein said update includes a program update.

52. A system for delivering an update to at least one user, comprising:
a creating unit for creating an electronic communication comprising an alert message, wherein the alert message comprises information about a virus outbreak; and
a sending unit for sending said electronic communication comprising said alert message to said at least one user.

53. The system of claim 52, wherein said alert message includes a link to an update.

54. The system of claim 53, wherein said update includes one or more virus signatures.

55. The system of claim 53, wherein said update includes one or more heuristics.

56. The system of claim 53, wherein said update includes a program update.

57. The system of claim 52, wherein said alert message includes instructions for obtaining an update.

58. The system of claim 57, wherein said update includes one or more virus signatures.

59. The system of claim 57, wherein said update includes one or more heuristics.

60. The system of claim 57, wherein said update includes a program update.

61. The system of claim 52, wherein said electronic communication additionally comprises a unique signature identifying said electronic communication as including said alert message.

62. The system of claim 52, wherein said electronic communication is an email.

63. The system of claim 52, wherein said electronic communication is an instant message.

64. A system for receiving an update, comprising:
a receiving unit for receiving an electronic communication;
an identifying unit for identifying whether said electronic communication includes an alert message, wherein the alert message comprises information about a virus outbreak; and
a displaying unit for displaying said alert message.

65. The system of claim 64, wherein said alert message includes a link to an update.

66. The system of claim 65, wherein said update includes one or more virus signatures.

67. The system of claim 65, wherein said update includes one or more heuristics.

68. The system of claim 65, wherein said update includes a program update.

69. The system of claim 64, wherein said alert message includes instructions for obtaining an update.

70. The system of claim 69, wherein said update includes one or more virus signatures.

71. The system of claim 69, wherein said update includes one or more heuristics.

72. The system of claim 69, wherein said update includes a program update.

73. The system of claim 64, wherein said electronic communication additionally comprises a unique signature identifying said electronic communication as including said alert message.

74. The system of claim 64, wherein said electronic communication is an email.

75. The system of claim 64, wherein said electronic communication is an instant message.

76. A system for delivering a sample, comprising:
a performing unit for performing a heuristic virus scan on a sample;
a creating unit for creating an electronic communication comprising said sample when said sample is found to have at least a low risk of being infected by a malicious program; and
a sending unit for sending said electronic communication to a provider.

77. The system of claim 76, wherein said electronic communication is an email.

78. The system of claim 76, wherein said electronic communication is an instant message.

79. A computer system comprising: a processor; and
a program storage device readable by the computer system, embodying a program of instructions executable by the processor to perform method steps for delivering an update to at least one user, the method comprising the following steps:

initiating, by a program provider, delivery of an update to at least one user;

creating an electronic communication comprising the update and a unique signature identifying said electronic communication as including said update; and sending said electronic communication to said at least one user.

80. The computer system of claim 79, wherein said electronic communication is an email.

81. The computer system of claim 79, wherein said electronic communication is an instant message.

82. The computer system of claim 79, wherein said update includes one or more virus signatures.

83. The computer system of claim 79, wherein said update includes one or more heuristics.

84. The computer system of claim 79, wherein said update includes a program update.

85. A computer system comprising: a processor; and a program storage device readable by the computer system, embodying a program of instructions executable by the processor to perform method steps for receiving an update, the method comprising the following steps:

receiving an electronic communication using a receiving unit;

scanning the electronic communication, using the receiving unit, for a unique signature, wherein the unique signature identifies that the electronic communication contains an update;

identifying whether said electronic communication includes the update; and passing the electronic communication to an applying unit capable of applying the update if the electronic communication has been identified as including an update; and applying said update.

86. The computer system of claim 85, wherein said electronic communication is an email.

87. The computer system of claim 85, wherein said electronic communication is an instant message.

88. The computer system of claim 85, wherein said update includes one or more virus signatures.

89. The computer system of claim 85, wherein said update includes one or more heuristics.

90. The computer system of claim 85, wherein said update includes a program update.

91. A computer system comprising: a processor; and a program storage device readable by the computer system, embodying a program of instructions executable by the processor to perform method steps for delivering an update to at least one user, the method comprising the following steps:

creating an electronic communication comprising an alert message, wherein the alert message comprises information about a virus outbreak; and sending said electronic communication comprising said alert message to said at least one user.

92. The computer system of claim 91, wherein said alert message includes a link to an update.

93. The computer system of claim 92, wherein said update includes one or more virus signatures.

94. The computer system of claim 92, wherein said update includes one or more heuristics.

95. The computer system of claim 92, wherein said update includes a program update.

96. The computer system of claim 91, wherein said alert message includes instructions for obtaining an update.

97. The computer system of claim 96, wherein said update includes one or more virus signatures.

98. The computer system of claim 96, wherein said update includes one or more heuristics.

99. The computer system of claim 96, wherein said update includes a program update.

100. The computer system of claim 91, wherein said electronic communication additionally comprises a unique signature identifying said electronic communication as including said alert message.

101. The computer system of claim 91, wherein said electronic communication is an email.

102. The computer system of claim 91, wherein said electronic communication is an instant message.

103. A computer system comprising: a processor; and a program storage device readable by the computer system, embodying a program of instructions executable by the processor to perform method steps for receiving an update, the method comprising the following steps:

receiving an electronic communication;

identifying whether said electronic communication includes an alert message, wherein the alert message comprises information about a virus outbreak; and displaying said alert message.

104. The computer system of claim 103, wherein said alert message includes a link to an update.

105. The computer system of claim 104, wherein said update includes one or more virus signatures.

106. The computer system of claim 104, wherein said update includes one or more heuristics.

107. The computer system of claim 104, wherein said update includes a program update.

108. The computer system of claim 103, wherein said alert message includes instructions for obtaining an update.

109. The computer system of claim 108, wherein said update includes one or more virus signatures.

110. The computer system of claim 108, wherein said update includes one or more heuristics.

111. The computer system of claim 108, wherein said update includes a program update.

112. The computer system of claim 103, wherein said electronic communication additionally comprises a unique signature identifying said electronic communication as including said alert message.

113. The computer system of claim 103, wherein said electronic communication is an email.

114. The computer system of claim 103, wherein said electronic communication is an instant message.

115. A computer system comprising: a processor; and a program storage device readable by the computer system, embodying a program of instructions executable by the processor to perform method steps for delivering a sample, the method comprising the following steps:

performing a heuristic virus scan on a sample;

creating an electronic communication comprising said sample when said sample is found to have at least a low risk of being infected by a malicious program; and sending said electronic communication to a provider.

116. The computer system of claim 115, wherein said electronic communication is an email.

117. The computer system of claim 115, wherein said electronic communication is an instant message.

* * * * *